US008284713B2

(12) United States Patent
Asati et al.

(10) Patent No.: US 8,284,713 B2
(45) Date of Patent: Oct. 9, 2012

(54) WIRELESS AUDIO SYSTEMS AND RELATED METHODS

(75) Inventors: Rajiv Asati, Morrisville, NC (US); Jason Guy, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1038 days.

(21) Appl. No.: 11/352,123

(22) Filed: Feb. 10, 2006

(65) Prior Publication Data

US 2007/0189202 A1 Aug. 16, 2007

(51) Int. Cl.
*H04W 4/00* (2009.01)

(52) U.S. Cl. ........ 370/328; 370/338; 455/334; 455/450; 455/509; 455/550.1; 455/563; 455/41.2; 381/311; 381/79

(58) Field of Classification Search .................. 370/338, 370/328; 455/334, 450, 509, 550.1, 563, 455/41.2; 381/311, 79
See application file for complete search history.

(56) References Cited

U.S. PATENT DOCUMENTS

| | | | | |
|---|---|---|---|---|
| 6,608,907 | B1 * | 8/2003 | Lee | 381/311 |
| 7,706,415 | B2 * | 4/2010 | Varma et al. | 370/535 |
| 2003/0210796 | A1 * | 11/2003 | McCarty et al. | 381/81 |
| 2003/0216181 | A1 * | 11/2003 | Danieli et al. | 463/39 |
| 2004/0037433 | A1 * | 2/2004 | Chen | 381/79 |
| 2004/0208325 | A1 * | 10/2004 | Cheung et al. | 381/79 |
| 2005/0107029 | A1 * | 5/2005 | Walker et al. | 455/3.02 |
| 2005/0259694 | A1 * | 11/2005 | Garudadri et al. | 370/503 |
| 2006/0121931 | A1 * | 6/2006 | Lin et al. | 455/550.1 |
| 2006/0270373 | A1 * | 11/2006 | So | 455/306 |
| 2009/0129601 | A1 * | 5/2009 | Ojala et al. | 381/1 |

OTHER PUBLICATIONS

Linksys®, A Division of Cisco Systems, Inc., Wireless A/G Media Center Extender Product Data, Model No. WMCE54AG, 2004, pp. 1-2.
Linksys®, A Division of Cisco Systems, Inc., Wireless-B Media Adapter Product Data, Model No. WMA11B, 2003, pp. 1-2.
Bose®, Bose® Link AL8, Homewide Wireless Audio Link Owner's Guide, 2005, pp. 1-12.
Advanced Television Systems Committee, Inc., Digital Audio Compression Standard (AC-3, E-AC-3) Revision B, Document A/52B, Sections 5 and 6, pp. 28-55, Jun. 14, 2005.
http://tools.ietf.org/html/rfc4184, Apr. 19, 2006.
http://www.ietf.org/rfc/rfc3550.txt, Jul. 2003.
http://tools.ietf.org/html/rfc5691; RTP Payload Format for Elementary Streams with MPEG Surround Multi-Channel Audio, Oct. 2009.
http://www.ietf.org/html/rfc3640 RTP Payload Format for Transport of MPEG-4 Elementary Streams, Nov. 2003.

* cited by examiner

*Primary Examiner* — Rafael Pérez-Gutiérrez
*Assistant Examiner* — Liton Miah
(74) *Attorney, Agent, or Firm* — Haynes and Boone, LLP

(57) ABSTRACT

Systems and methods are provided to facilitate the distribution of audio signals over wireless networks. In one implementation, an audio system includes a head end having an encoder and a wireless network interface. Audio signals associated with a plurality of audio channels are processed by the encoder to provide an encoded signal in accordance with an audio codec. The encoded signal can be provided to a wireless network by the wireless network interface as a plurality of data packets associated with a network address in accordance with a wireless networking protocol, such as an IEEE 802.11 protocol. One or more remote endpoints can also be provided to receive the data packets from the wireless network, assemble the data packets to obtain the encoded signal, and extract at least one of the audio signals from the encoded signal in accordance with the audio codec. Multicast and unicast implementations are also provided.

30 Claims, 4 Drawing Sheets

WIRELESS AUDIO SYSTEMS AND RELATED METHODS

BACKGROUND

1. Field of the Invention

The present invention generally relates to wireless networks and, more particularly, to the distribution of audio signals over wireless networks.

2. Related Art

Conventional audio systems typically utilize wired connections to pass signals between audio components. For example, audio cables and speaker wires are frequently employed to connect one or more audio sources with appropriate amplifiers and speakers. Such connections can be relatively straightforward for many consumers to implement, especially for uncomplicated audio systems where audio components are located in close proximity to each other.

However, for more complex audio system configurations, it can be difficult for consumers to implement such fully wired connections. For example, in large listening environments, speakers or amplifiers may be located a significant distance away from audio sources. For many permanent and semi-permanent installations, it may be impractical for consumers to imbed audio wiring in walls, ceilings, or other spaces where it may be hidden from view. As a result, unsightly audio wiring is often exposed in the listening environment which can detract from the consumer's enjoyment of the audio system.

These difficulties are multiplied many-fold in the case of multi-channel audio systems. For example, in conventional surround sound audio systems, additional amplifiers, speakers, and wired connections are typically required for each audio channel. It can be burdensome for consumers to run the many wires necessary to connect multiple speakers and amplifiers that may be located throughout a listening environment.

In addition, after an audio system has been installed, it can be difficult for consumers to subsequently provide audio signals to another location, such as another room of a residence, without running further audio wiring, spending extra time, and incurring extra cost. Moreover, after an audio system has been installed, if a consumer desires to transfer the system to another location (for example, from one residence to another), the consumer typically must reinvest substantial time and resources to reinstall the audio system at the new location, including installing new audio wiring to carry the audio signals throughout the new location.

Accordingly, there is a need for an improved approach to the distribution of audio signals to speakers and amplifiers that overcomes the deficiencies discussed above.

BRIEF DESCRIPTION OF THE FIGURES

Like element numbers in different figures represent the same or similar elements.

DETAILED DESCRIPTION

Figure 1:
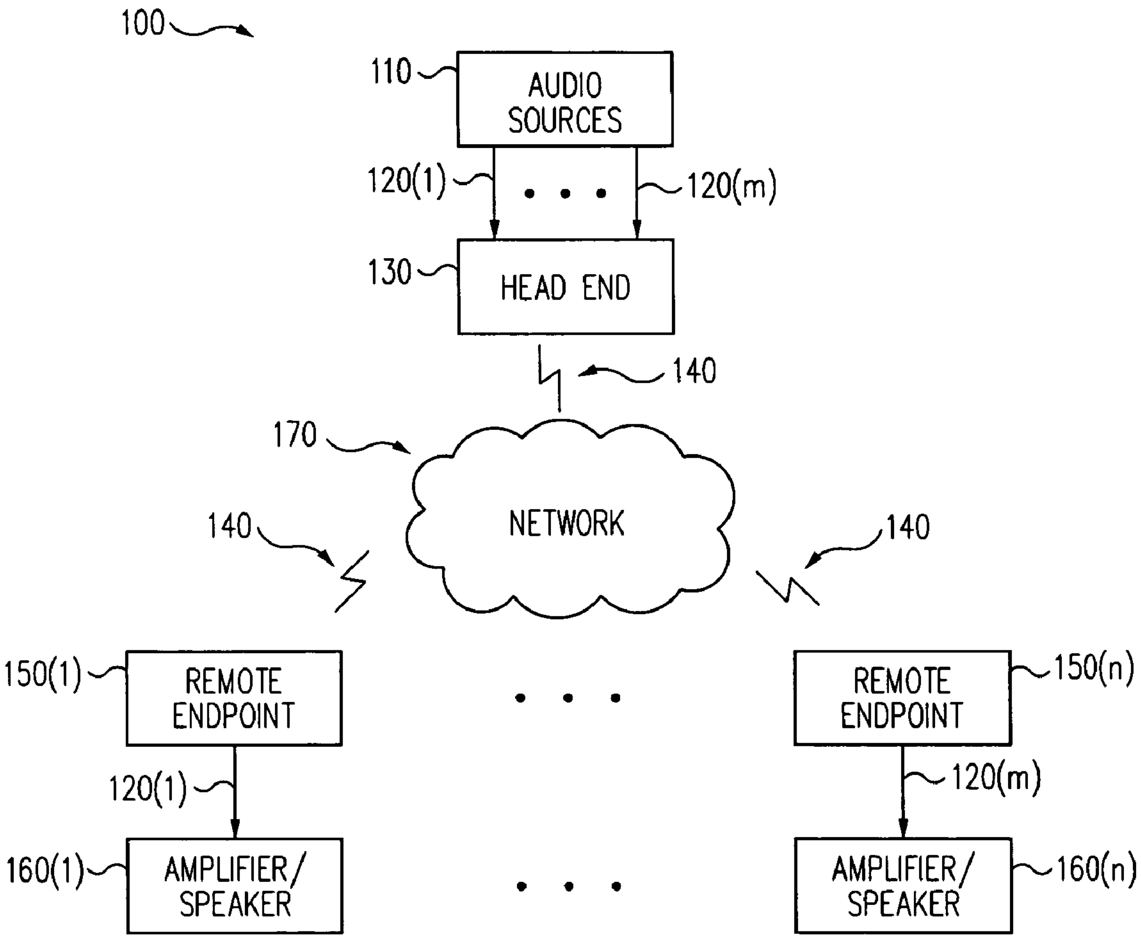
FIG. 1 is a simplified block diagram illustrating an audio system in accordance with an embodiment of the present invention.

Referring now to the drawings wherein the showings are for purposes of illustrating embodiments of the present invention only, and not for purposes of limiting the same, FIG. 1 is a simplified block diagram illustrating an audio system 100 in accordance with an embodiment of the present invention.

Audio system 100 includes a head end 130 in wireless communication with a plurality of remote endpoints 150. Head end 130 and remote endpoints 150 can be configured to support one or more wireless protocols such as IEEE 802.11a, b, or g, or any other desired wireless protocol, such as Bluetooth. As such, head end 130 and remote endpoints 150 can be viewed as nodes of a wireless network 170 which may be used to facilitate the transmission and reception of IP packets (multicast or unicast) carrying audio signals, as further described herein.

A plurality of audio signals 120 are provided to head end 130 from one or more audio sources 110 internal or external to head end 130 (i.e., the features of head end 130 and audio sources 110 may optionally reside in the same device). In one embodiment, a conventional hi-fi receiver may be used as an audio source, with audio signals 120 being provided by the hi-fi receiver. However, any appropriate audio source may be used. For example, audio sources 110 may include dedicated or general purpose audio devices such as conventional radio tuners, CD players, DVD players, digital file players (i.e., mp3 players), computer systems, or other audio devices known in the art.

Audio signals 120 may be analog or digital signals derived from compact discs, DVDs, digital audio files (for example, mp3 files), streaming media, television programs, or other appropriate media known in the art. Moreover, individual audio signals 120 need not be provided to head end 130 through discreet input ports. For example, it is contemplated that one or more of audio signals 120 (e.g., from 2 to 8 of audio signals 120) may be provided through a single connection, such as a multiplexed coaxial or fiber optic connection, between an audio source 110 and an input port of head end 130.

Audio system 100 can be implemented as a multi-channel audio system wherein one or more of audio signals 120 and remote endpoints 150 are associated with one or more individual audio channels. For example, a front audio channel of audio system 100 may be associated with remote endpoint 150(1) and amplifier/speaker combination 160(1). It will be appreciated that for this example, any of audio signals 120 may be associated with the front audio channel and used as the audio signal heard by a listener through the front audio channel. In various embodiments, audio system 100 may be implemented to support Dolby 5.1, Dolby 7.1, or other multi-channel configurations known in the art.

Head end 130 can be implemented to process and distribute audio signals 120 to remote endpoints 150 through wireless signals 140, as further described herein. At remote endpoints 150, audio signals 120 can be derived (for example, demultiplexed) from wireless signals 140, and the particular audio signals 120 encoded within encoded signal 215 and wireless signals 140 can be provided to associated amplifier/speaker combinations 160 without the need for wired connections between audio sources 110 and amplifier/speaker combinations 160, as further described herein.

Figure 2:
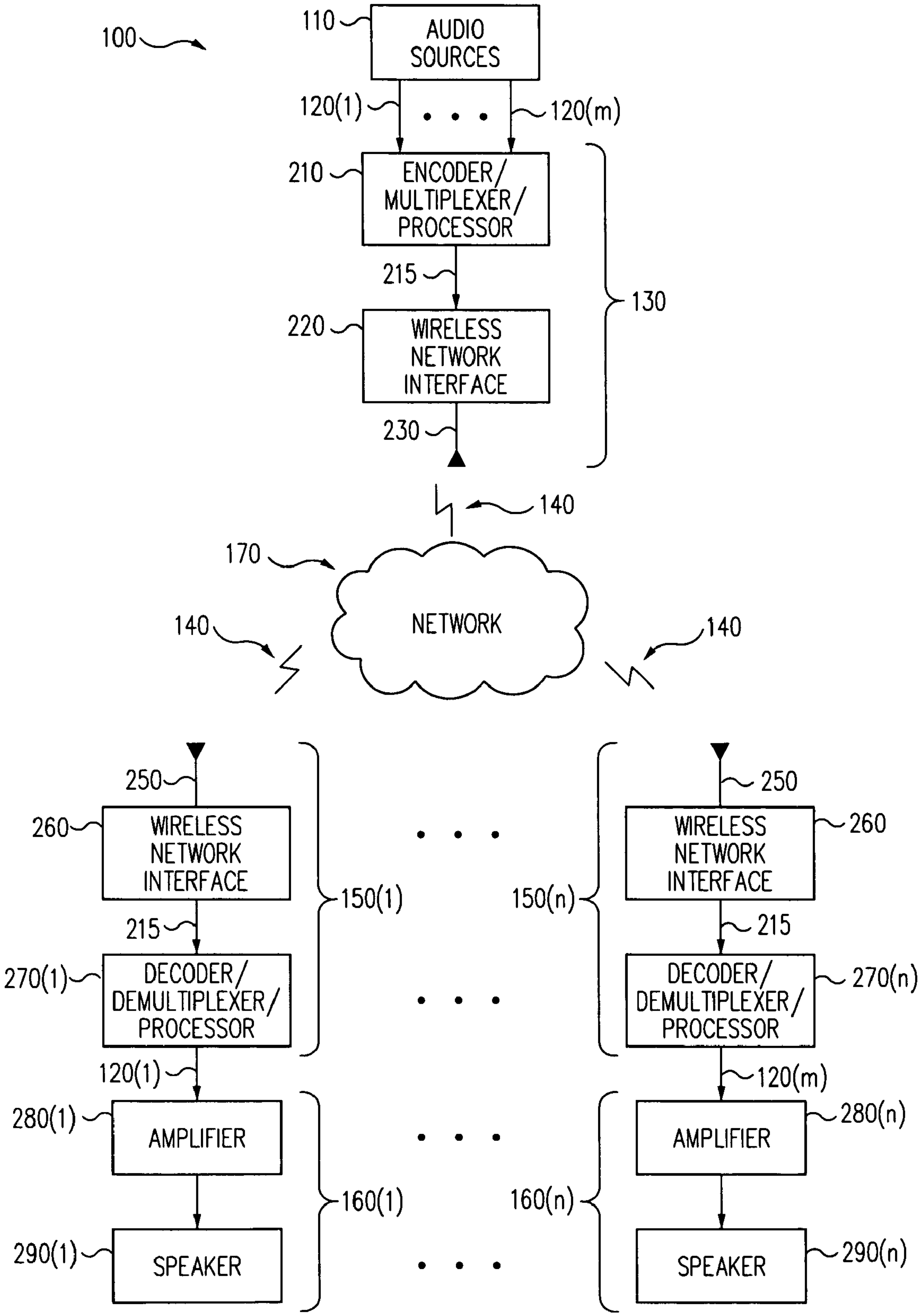
FIG. 2 is a block diagram illustrating further components of an audio system in accordance with an embodiment of the present invention.

Turning now to FIG. 2, a block diagram is provided that illustrates further components of audio system 100 in accordance with an embodiment of the present invention. As shown, head end 130 includes an encoder 210 which receives audio signals 120 from audio sources 110. Encoder 210 can be configured to process audio signals 120 in accordance with an audio codec to provide one or more encoded signals 215. For example, in one embodiment, encoder 210 can process audio signals 120 in accordance with an AC-3 codec (i.e., Dolby Digital™) available from Dolby Laboratories to provide a single encoded signal 215 which includes the content of audio signals 120 in compressed format. Advantageously, the AC-3 codec employs built-in synchronization, permitting it to be conveniently used with RTP/UDP protocols (i.e. real-time transport protocol/user datagram protocol) employed by various wireless networks. For example, synchronization may be achieved using Timestamping within the RTP AC-3 header, and a Synchronization Information (SI) field within the AC-3 header. The SI field contains the information needed to acquire and maintain codec synchronization in such an embodiment. However, it will be appreciated that encoder 210 can be implemented to process audio signals 120 in accordance with any appropriate lossy, lossless, and/or multiplexed audio codec known in the art. For example, where an AC-3 codec is used, an AC-3 frame may be inserted in an RTP payload, wherein the payload would represent all audio signals 120 (which are associated with various audio channels) at a given time slice.

Encoder 210 can be implemented with appropriate hardware, software, or combinations of hardware and software adapted to perform the encoding described herein. For example, encoder 210 may be implemented as one or more general purpose computing devices, application-specific computing devices, and/or other computing devices known in the art. Encoder 210 may optionally be provided with analog-to-digital (A/D) converters to convert any of audio signals 120 from analog signals to digital signals as may be desired. In the event that one or more of audio signals 210 are provided to encoder 210 as an encoded signal in accordance with an audio codec (for example, through a multiplexed coaxial or fiber optic connection as previously described herein), encoder 210 may optionally perform multiplexing and/or pass the encoded signal to wireless network interface 220 without performing the encoding described above.

Head end 130 further includes a wireless network interface 220 having an antenna 230. As illustrated, wireless network interface 220 can receive encoded signal 215 from encoder 210 and provide encoded signal 215 to wireless network 170 in the form of wireless signals 140 from antenna 230. In one embodiment, wireless network interface 220 can be configured to convert encoded signal 215 to a plurality of data packets and distribute the data packets through wireless signals 140 in accordance with the wireless networking protocol of wireless network 170. For example, where an AC-3 codec is used, individual AC-3 frames of encoded signal 215 may be provided as RTP/UDP payloads encapsulated within IP (i.e., Internet protocol) Multicast packets to be sent as wireless signals 140 to a specified address (for example, a multicast MAC address) of wireless network 170 implementing one of the IEEE 802.11 protocols. It will be appreciated that by using an IP multicast destination address, a one-to-many distribution mode can be provided in which one transmitted packet can be received by multiple recipients, and the wireless spectrum is efficiently utilized.

Each of remote endpoints 150 includes a decoder 270 and a wireless network interface 260 having an antenna 250. Wireless signals 140 received from head end 130 are processed by wireless network interface 260 to obtain the original encoded signal 215 provided by encoder 210. For example, data packets distributed in wireless signals 140 (e.g., RTP payloads corresponding to AC-3 frames of encoded signal 215) can be assembled by wireless network interface 260 to obtain encoded signal 215.

Decoder 270 can be configured to extract at least one of audio signals 120 from encoded signal 215 in accordance with the audio codec used by encoder 210. For example, in an embodiment using an AC-3 codec, each of decoders 270 can extract from encoded signal 215 the particular audio signal 120 associated with its remote endpoint 150. Similar to encoder 210, decoder 270 can be implemented with appropriate hardware, software, or combinations of hardware and software adapted to perform the decoding described herein. For example, decoder 270 may be implemented as one or more general purpose computing devices, application-specific computing devices, and/or other computing devices known in the art.

The audio signal 120 extracted by each decoder 270 can be provided to an associated amplifier 280 which provides an amplified version of the signal to an associated speaker 290 where it can be reproduced and perceived by a listener. It will be appreciated that amplifiers 280 and speakers 290 of amplifier/speaker combinations 160 can be implemented as any desired configuration of audio components such as, for example, separate amplifiers and loudspeakers, loudspeakers having integrated amplifiers (i.e., powered speakers), or other configurations as may be appropriate for particular applications.

In various embodiments, amplifiers 280 may be optionally integrated within remote endpoints 150. In such embodiments, remote endpoints 150 may be provided with hardware and/or software controls to enable or disable amplifiers 280, adjust the gain of amplifiers 280, or otherwise configure amplifiers 280 as may be desired in particular applications. For example, remote endpoints 150 may be provided with one or more switches or graphical user interface (GUI) controls to facilitate such operations.

Each of remote endpoints 150 has an associated network address in wireless network 170. In one embodiment, each of remote endpoints 150 can be provisioned such that each remote endpoint 150 can receive and process the same data packets provided by wireless signals 140 (i.e., a multicast implementation). In such an embodiment, the destination address of the data packets is a multicast address.

In another embodiment, each of remote endpoints 150 can be provisioned such that each remote endpoint 150 receives data packets directed to its own assigned network address (i.e., a unicast implementation). In such a unicast implementation, each audio channel associated with audio signals 120 may also be assigned to a network address of one or more of endpoints 150. In this embodiment, encoder 210 separately encodes audio signals 120 to provide a plurality of encoded signals 215 (i.e., an encoded signal 215 for each audio channel). The encoded signals 215 are converted into data packets and sent by wireless network interface 220 to the network addresses assigned to the corresponding audio signals 120. As a result, in a unicast implementation, each remote endpoint 150 will receive and process only those data packets corresponding to the particular audio signal 120 assigned to the same network address as the remote endpoint 150.

Figure 3:
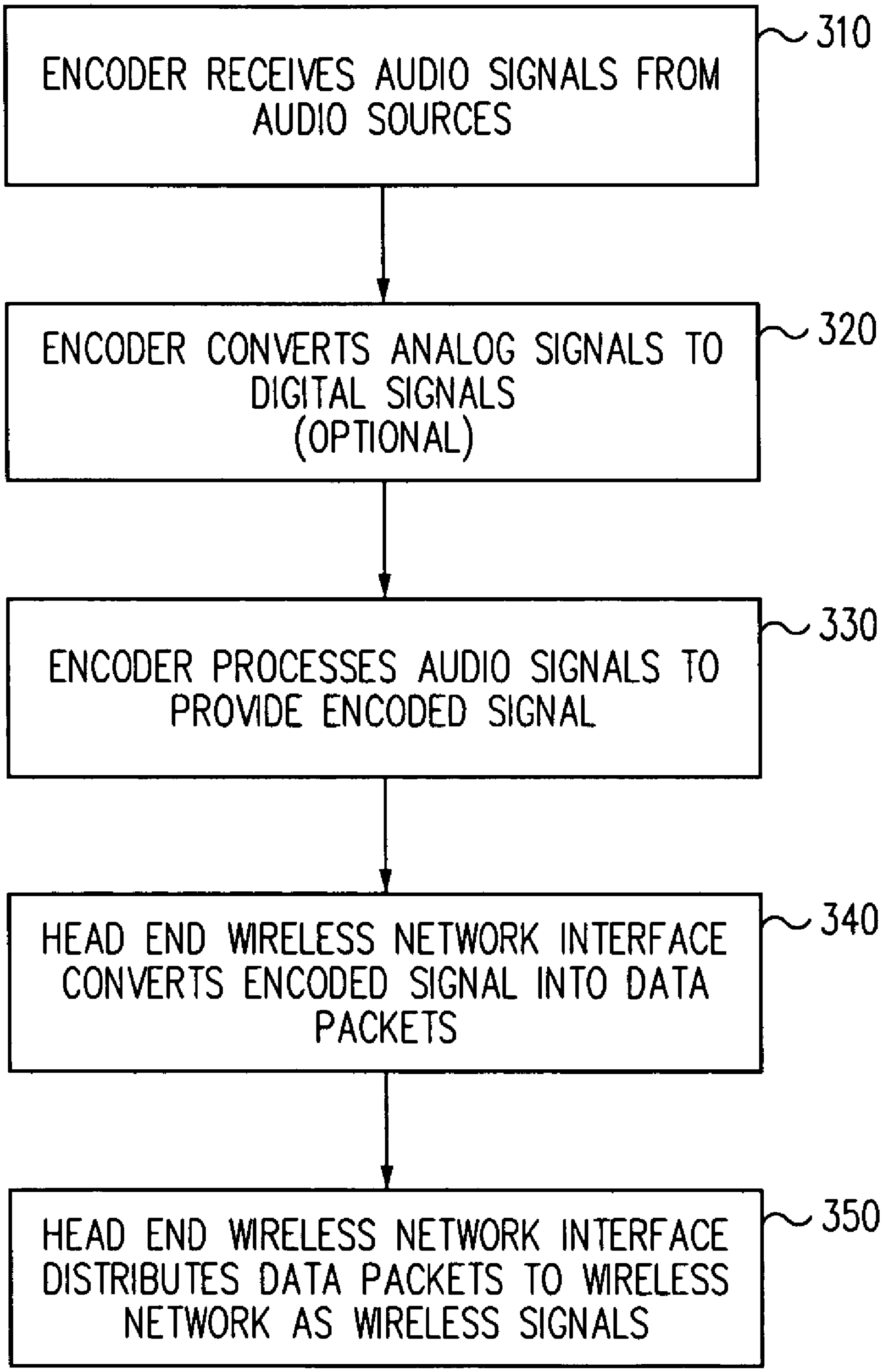
FIG. 3 is a flowchart illustrating a process for transmitting audio signals over a wireless network in accordance with an embodiment of the present invention.
Figure 4:
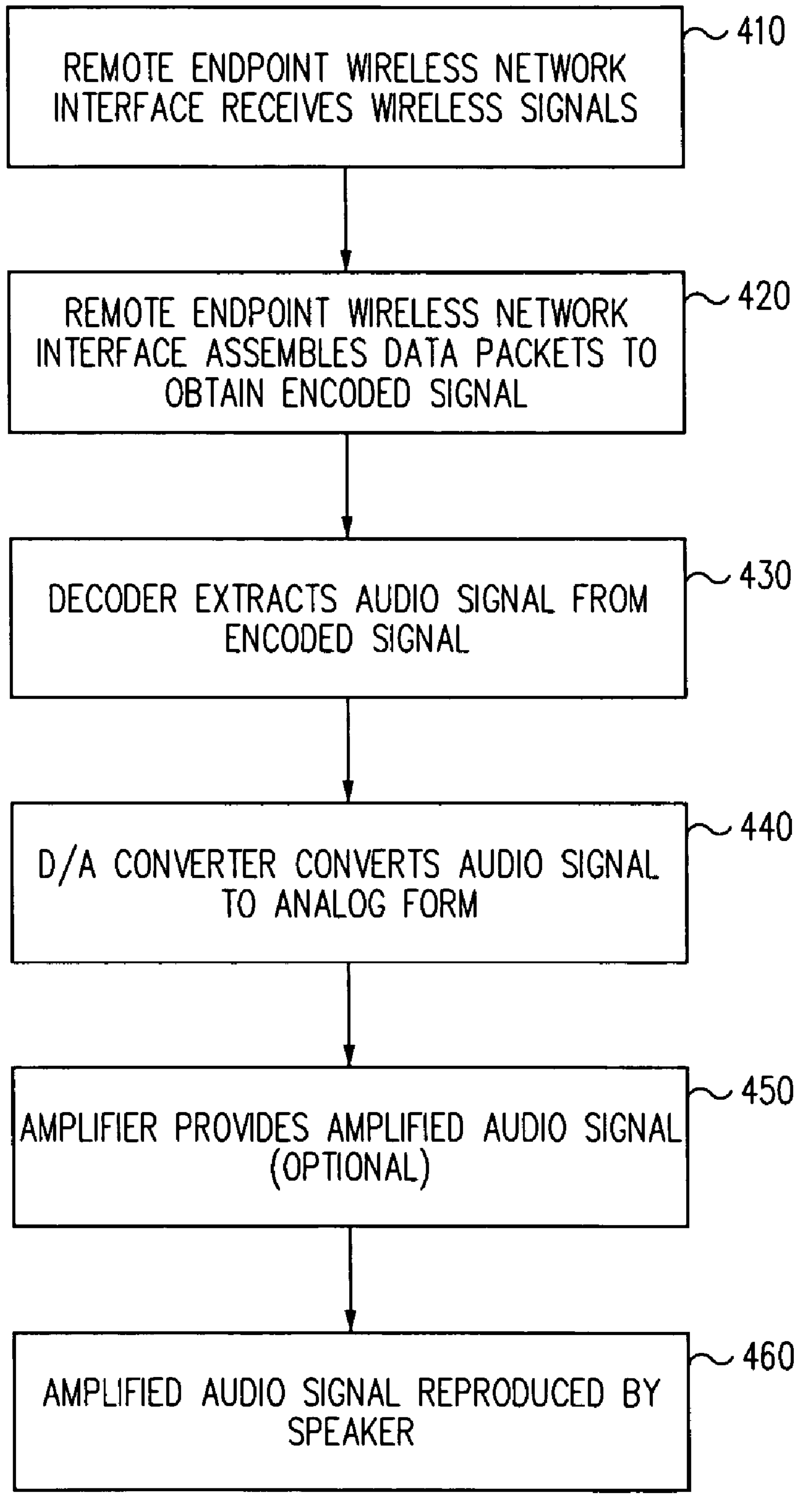
FIG. 4 is a flowchart illustrating a process for receiving audio signals over a wireless network in accordance with an embodiment of the present invention.

Operation of audio system 100 can be further understood with reference to the processes illustrated in FIGS. 3 and 4. FIG. 3 is a flowchart illustrating a process for transmitting audio signals over wireless network 170 in accordance with an embodiment of the present invention. FIG. 4 is a flowchart illustrating a process for receiving audio signals over wireless network 170 in accordance with an embodiment of the present invention.

Referring now to FIG. 3, at initial step 310, encoder 210 of head end 130 receives audio signals 120 from audio sources 110. If any of audio signals 120 are analog signals, encoder 210 converts the analog signals to digital signals through appropriate (A/D) converters in optional step 320.

Encoder 210 processes audio signals 120 in accordance with an audio codec to provide encoded signal 215 (step 330). Wireless network interface 220 of head end 130 then converts encoded signal 215 into data packets suitable for distribution over wireless network 170 (step 340). Wireless network interface 220 distributes the data packets to wireless network 170 as wireless signals 140 broadcast from antenna 230 to the network address, which is acceptable at the remote endpoints 150 (step 350).

It will be appreciated that the process of FIG. 3 refers to an embodiment of audio system 100 utilizing a multicast implementation. In a unicast implementation, steps 330-350 can be modified to provide, convert, and distribute encoded signals 215 for each of audio signals 120 as wireless signals 140 sent to different network addresses (i.e., particular network addresses associated with each audio signal 120 and remote endpoint 150).

Referring to FIG. 4, at step 410, wireless network interface 260 of each of remote endpoints 150 receives wireless signals 140 corresponding to the network address associated with the remote endpoint 150. Wireless network interface 260 then processes wireless signals 140 and assembles data packets distributed in wireless signals 140 to obtain encoded signal 215 (step 420). The encoded signal 215 is provided to decoder 430 which extracts at least one of audio signals 120 from encoded signal 215 (step 430). The audio signal 120 extracted by decoder 270 is converted to analog form (i.e., an analog signal) with the use of a D/A converter (step 440) which may optionally be provided as part of remote endpoint 150 or amplifier/speaker combination 160. The audio signal 120 (now in analog form) is optionally amplified by amplifier 280 (step 450) which then provides an amplified version of the audio signal to speaker 290 where it can be reproduced to be perceived by a listener (step 460).

In view of the present disclosure, it will be appreciated that various features set forth herein provide significant improvements to the distribution of audio signals. In particular, the wireless features of various embodiments of audio system 100 permit audio signals 120 to be provided to remote amplifiers 280 and speakers 290 without extensive audio wiring spanning the distance between such components and audio sources 110. As a result, the audio wiring utilized to implement multi-channel audio systems can be significantly reduced.

Audio system 100 can also be conveniently relocated without the need for reinstalling audio wiring between audio sources 110 and remote endpoints 150. In addition, remote endpoints 150 can be conveniently located at separate locations (for example, different rooms), thereby allowing audio signals 120 to be simultaneously distributed through a plurality of areas. Moreover, by associating one or more of endpoints 150 with the same audio channel (i.e., associating one or more of audio signals 120 to more than one remote endpoint 150), duplicate listening environments can be easily realized.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can stored on one or more computer readable mediums. It is also contemplated that software identified herein can be implemented using one or more general purpose or specific purpose computers and/or computer systems, networked and/or otherwise.

Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the present invention, persons of ordinary skill in the art will recognize that changes may be made in form and detail without departing from the scope of the invention. Thus the invention is limited only by the following claims.

What is claimed is:

1. An audio system comprising:

an encoder that processes a plurality of audio signals to provide the audio signals in an encoded signal comprising a plurality of frames in accordance with an audio codec, wherein each frame comprises timestamping and synchronization information to maintain synchronization of the encoded signal, and wherein the audio signals are associated with a plurality of audio channels; and a first wireless network interface that:

converts the frames of the encoded signal into a plurality of data packets in accordance with a wireless networking protocol, wherein each data packet comprises, inside, a corresponding one of the frames of the encoded signal including the timestamping and synchronization information of the corresponding one of the frames, wherein the audio signals in the encoded signal are encoded for a given time-slice into the same data packet; and distributes the data packets to a wireless network in accordance with the wireless networking protocol, wherein each distributed data packet comprises Real Time Protocol (RTP) payloads encapsulated within Internet protocol (IP) corresponding to each one of the frames of the encoded signal, wherein at least one of the audio signals from the encoded signal is extracted by each decoder of a corresponding remote endpoint associated with one of the audio channels in accordance with the audio codec such that the audio signals associated with the plurality of audio channels are inside the RTP payloads and one or more of the audio signals is associated with a front audio channel and used as the audio signal heard by a listener through the front audio channel.

2. The audio system of claim 1, wherein the data packets are associated with a network address in accordance with the wireless networking protocol.

3. The audio system of claim 2, further comprising a plurality of remote endpoints associated with the network address in a multicast implementation, wherein each of the remote endpoints is associated with one of the audio channels.

4. The audio system of claim 3, wherein at least one of the remote endpoints comprises:

a second wireless network interface that receives the data packets from the wireless network and assemble the data packets to obtain the encoded signal; and the decoder that extracts at least one of the audio signals from the encoded signal in accordance with the audio codec.

5. The audio system of claim 4, wherein the at least one of the remote endpoints further comprises an amplifier that receives the at least one of the audio signals from the decoder.

6. The audio system of claim 4, wherein the at least one of the remote endpoints further comprises an amplified speaker that receives the at least one of the audio signals from the decoder.

7. The audio system of claim 1, wherein the wireless networking protocol is an IEEE 802.11 protocol.

8. The audio system of claim 1, wherein the audio codec is AC-3.

9. The audio system of claim 1, wherein the encoded signal is a compressed audio signal.

10. An audio system comprising:

a first wireless network interface that receives a plurality of data packets from a second wireless network interface over a wireless network in accordance with a wireless networking protocol and assemble the data packets to obtain an encoded signal, wherein each data packet was converted from a plurality of frames of the encoded signal at the second wireless network interface, and each data packet comprises, inside, a corresponding one of the plurality of frames of the encoded signal, wherein each frame comprises timestamping and synchronization information to maintain synchronization of the encoded signal, wherein each data packet comprises Real Time Protocol (RTP) payloads encapsulated within Internet protocol (IP) corresponding to each frame of the encoded signal, wherein the encoded signal comprises at least one of a plurality of audio signals processed in accordance with an audio codec, wherein the audio signals are associated with a plurality of audio channels, and wherein the audio signals in the encoded signal are encoded for a given time-slice into the same data packet; and at least one decoder, wherein each decoder extracts the at least one of the audio signals from the encoded signal in accordance with the audio codec, such that the at least one of the audio signals associated with the plurality of audio channels are inside the RTP payloads and the at least one of the audio signals is associated with a front audio channel and used as the audio signal heard by a listener through the front audio channel.

11. The audio system of claim 10, wherein the first wireless network interface and the decoder comprise a remote endpoint associated with at least one of the audio channels.

12. The audio system of claim 10, further comprising a head end comprising:

an encoder that processes the audio signals in accordance with the audio codec to provide the encoded signal; and the second wireless network interface that distributes the encoded signal to the wireless network as the data packets in accordance with the wireless networking protocol.

13. The audio system of claim 10, further comprising an amplifier that receives the at least one of the audio signals from the decoder.

14. The audio system of claim 13, wherein the first wireless network interface, the decoder, and the amplifier comprise a remote endpoint associated with at least one of the audio channels.

15. The audio system of claim 14, wherein the remote endpoint further comprises a control that configures the amplifier.

16. The audio system of claim 15, wherein the control selects between an enabled state and a disabled state of the amplifier.

17. The audio system of claim 15, wherein the control adjusts a gain of the amplifier.

18. The audio system of claim 15, wherein the control is a switch.

19. The audio system of claim 15, wherein the control is a graphical user interface (GUI).

20. The audio system of claim 10, further comprising an amplified speaker that receives the at least one of the audio signals from the decoder.

21. The audio system of claim 10, wherein the wireless networking protocol is an IEEE 802.11 protocol.

22. The audio system of claim 10, wherein the audio codec is AC-3.

23. The audio system of claim 10, wherein the encoded signal is a compressed audio signal.

24. A method of providing a plurality of audio signals for an audio system, the method comprising:

receiving an encoded signal comprising a plurality of audio signals encoded in a plurality of frames in accordance with an audio codec, wherein each frame comprises timestamping and synchronization information to maintain synchronization of the encoded signal, and wherein the audio signals are associated with a plurality of audio channels;

converting the frames of the encoded signal into a plurality of data packets, wherein each data packet comprises inside a corresponding one of the frames of the encoded signal including the timestamping and synchronization information of the corresponding one of the frames, wherein the audio signals in the encoded signal are encoded for a given time-slice into the same data packet; and distributing the data packets to a wireless network in accordance with a wireless networking protocol, wherein each distributed data packet comprises Real Time Protocol (RTP) payloads encapsulated within Internet protocol (IP) corresponding to each one of the frames of the encoded signal, wherein at least one of the audio signals from the encoded signal is extracted by each decoder of a corresponding remote endpoint associated with one of the audio channels in accordance with the audio codec such that the audio signals associated with the plurality of audio channels are inside the RTP payloads and one or more of the audio signals is associated with a front audio channel and used as the audio signal heard by a listener through the front audio channel.

25. The method of claim 24, further comprising:

receiving the data packets over the wireless network;

assembling the data packets to obtain the encoded signal; and extracting at least one of the audio signals from the encoded signal in accordance with the audio codec.

26. The method of claim 24, wherein the wireless networking protocol is an IEEE 802.11 protocol.

27. An audio system comprising:

means for processing a plurality of audio signals to provide the audio signals in an encoded signal comprising a plurality of frames in accordance with an audio codec, wherein each frame comprises timestamping and synchronization information to maintain synchronization of the encoded signal, and wherein the audio signals are associated with a plurality of audio channels;

means for converting the frames of the encoded signal into a plurality of data packets in accordance with a wireless networking protocol, wherein each data packet comprises inside a corresponding one of the frames of the encoded signal including the timestamping synchronization information of the corresponding one of the frames, wherein the audio signals in the encoded signal are encoded for a given time-slice into the same data packet; and means for distributing the data packets to a wireless network in accordance with the wireless networking protocol, wherein each distributed data packet comprises Real Time Protocol (RTP) payloads encapsulated within Internet protocol (IP) corresponding to each one of the frames of the encoded signal, wherein at least one of the audio signals from the encoded signal is extracted by each means for decoding of a corresponding remote endpoint that is associated with one of the audio channels in accordance with the audio codec such that the audio signals associated with the plurality of audio channels are inside the RTP payloads and one or more of the audio signals is associated with a front audio channel and used as the audio signal heard by a listener through the front audio channel.

28. The audio system of claim 27, wherein the data packets are associated with a network address in accordance with the wireless networking protocol.

29. An audio system comprising:

means for receiving a plurality of data packets from a means for transmitting the plurality of data packets over a wireless network in accordance with a wireless networking protocol;

means for assembling the data packets to obtain an encoded signal, wherein each data packet was converted from a plurality of frames of the encoded signal in the means for transmitting, wherein each data packet comprises inside a corresponding one of the plurality of frames of the encoded signal, wherein each frame comprises timestamping and synchronization information to maintain synchronization of the encoded signal, wherein each data packet comprises Real Time Protocol (RTP) payloads encapsulated within Internet protocol (IP) corresponding to each frame of the encoded signal, wherein the encoded signal comprises at least one of a plurality of audio signals processed in accordance with an audio codec, wherein the audio signals are associated with a plurality of audio channels, and wherein the audio signals in the encoded signal are encoded for a given time-slice into the same data packet; and at least one means for extracting, wherein each means for extracting extracts the at least one of the audio signals from the encoded signal in accordance with the audio codec, such that the audio signals associated with the plurality of audio channels are inside the RTP payloads and one or more of the audio signals is associated with a front audio channel and used as the audio signal heard by a listener through the front audio channel.

30. The audio system of claim 29, further comprising means for amplifying the at least one of the audio signals.

* * * * *